(12) United States Patent
Mao et al.

(10) Patent No.: US 11,307,354 B2
(45) Date of Patent: Apr. 19, 2022

(54) WAVELENGTH SELECTIVE SWITCH BASED ON LCOS

(71) Applicant: HUAWEI TECHNOLOGIES CO., LTD., Guangdong (CN)

(72) Inventors: Lei Mao, Dongguan (CN); Liangjia Zong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/329,426

(22) Filed: May 25, 2021

(65) Prior Publication Data

US 2021/0278596 A1 Sep. 9, 2021

Related U.S. Application Data

(63) Continuation of application No. PCT/CN2019/091120, filed on Jun. 13, 2019.

(30) Foreign Application Priority Data

Nov. 26, 2018 (CN) .......................... 201811413981.7

(51) Int. Cl.
*G02B 6/26* (2006.01)
*G02B 6/293* (2006.01)
*G02B 6/35* (2006.01)

(52) U.S. Cl.
CPC ......... *G02B 6/29304* (2013.01); *G02B 6/354* (2013.01)

(58) Field of Classification Search
CPC .. G02B 6/29304; G02B 6/354; G02B 6/2931; G02B 6/3548; G02B 6/3558;
(Continued)

(56) References Cited

U.S. PATENT DOCUMENTS

| 7,626,754 B2* | 12/2009 | Reimer | G02B 27/46 342/368 |
| 8,300,995 B2* | 10/2012 | Colbourne | G02B 6/356 385/17 |

(Continued)

FOREIGN PATENT DOCUMENTS

| CN | 102868476 A | 1/2013 |
| CN | 103281153 A | 9/2013 |

(Continued)

OTHER PUBLICATIONS

Notice of Allowance dated Aug. 31, 2021 for Chinese Application No. 201811413981.7, 4 pages.

(Continued)

*Primary Examiner* — Ellen E Kim

(57) ABSTRACT

The technology described herein relates to a wavelength selective switch (WSS). An output port arrangement solution of an optical fiber array of the WSS includes: centers of output ports are arranged along a curve or along a combination line that includes a line segment, and a straight line connecting centers of any two output ports on the curve or the combination line does not pass through an input port. A light beam received from the input port is diffracted to the output ports through an LCoS panel, and a straight line that all diffraction orders that are generated after the diffraction pass through intersects with the curve or the line segment, and there is only one intersection point.

18 Claims, 9 Drawing Sheets

(58) Field of Classification Search
CPC .. G02B 6/356; G02B 6/3524; G02B 6/29316; H04Q 2011/0026; H04Q 2011/0049; H04Q 11/0005; H04J 14/0212
See application file for complete search history.

(56) References Cited

U.S. PATENT DOCUMENTS

| | | | |
|---|---|---|---|
| 8,977,079 | B2 | 3/2015 | McLaughlin |
| 9,341,870 | B1* | 5/2016 | Wagener ............... G02B 6/2861 |
| 2008/0285919 | A1* | 11/2008 | Ho ........................... G01J 3/22 |
| | | | 385/37 |
| 2010/0046884 | A1 | 2/2010 | Presley et al. |
| 2014/0233891 | A1* | 8/2014 | Pottier ............... G02B 27/4244 |
| | | | 385/37 |
| 2015/0316725 | A1 | 11/2015 | Nakajima et al. |
| 2016/0234576 | A1 | 8/2016 | Suh et al. |
| 2017/0299858 | A1 | 10/2017 | Zong et al. |

FOREIGN PATENT DOCUMENTS

| | | |
|---|---|---|
| CN | 103543497 A | 1/2014 |
| CN | 104297858 A | 1/2015 |
| CN | 104583824 A | 4/2015 |
| CN | 104597572 A | 5/2015 |
| JP | 2017191252 A | 10/2017 |
| WO | 2013016758 A1 | 2/2013 |
| WO | 2013049942 A1 | 4/2013 |
| WO | 2018076195 A1 | 5/2018 |

OTHER PUBLICATIONS

International Search Report and Written Opinion issued in PCT/CN2019/091120, dated Sep. 2, 2019, total 9 pages.
Office Action issued in CN 201811413981.7, dated Apr. 13, 2021, total 5 pages.
Brian Robertson et al., Reduction of Crosstalk in a Colourless, Multicasting LCOS Based Wavelength Selective Switch by the Application of Wavefront Encoding, 2012 SPIE, total 8 pages.
European Patent Office extended European Search Report for Application No. 19891182.8 dated Oct. 20, 2021, 11 pages.

* cited by examiner

WAVELENGTH SELECTIVE SWITCH BASED ON LCOS

CROSS-REFERENCE TO RELATED APPLICATIONS

This application is a continuation of International Application No. PCT/CN2019/091120, filed on Jun. 13, 2019, which claims priority to Chinese Patent Application No. 201811413981.7, filed on Nov. 26, 2018. The disclosures of the aforementioned applications are hereby incorporated by reference in their entireties.

TECHNICAL FIELD

This application relates to the field of optical communications and, in particular, to a wavelength selective switch based on an Liquid Crystal on Silicon (LCoS) optical switching engine.

BACKGROUND

With a rapid growth of network traffic and bandwidth, operators have an increasingly urgent demand for an intelligent scheduling function of a physical layer wavelength division multiplexing network. Therefore, a Reconfigurable Optical Add-Drop Multiplexer (ROADM) is gradually used on increasingly more high-end networks of operators. After the ROADM is introduced into a network, an operator can quickly provide a wavelength-level service. This facilitates network planning to reduce operation costs, and facilitates maintenance to reduce maintenance costs.

The ROADM needs a considerable quantity of Wavelength selective switches (WSS) to perform optical interconnection between upstream and downstream modules and input and output ports that are connected to other nodes. For future development of the ROADM, a WSS may develop first. Therefore, the WSS is used as an important wavelength routing module in the ROADM, and performance indicators of the WSS directly affect performance of an entire network. In addition, in recent years, because an LCoS supports a Flex-grid feature, and the LCoS has replaced a Micro-Electro-Mechanical System (MEMS) and become a mainstream switching engine of a current WSS.

An operating principle of the LCoS is that different voltages are loaded on different pixels of the LCoS. Due to a birefringent effect of a liquid crystal, the different voltages are corresponding to different phase delays. In this way, a structure similar to a blazed grating may be formed. Because a diffraction angle of the blazed grating depends on a grating period of the blazed grating, only grating periods corresponding to different locations on the LCoS need to be changed, to control a diffraction angle of incident light, so that diffractive light is output from different ports of the WSS. In this way, a function of the wavelength selective switch is implemented.

However, because the operating principle of the LCoS is based on a diffraction effect, when required diffractive light is obtained, some high diffraction orders are generated due to a phase error. FIG. 1 shows an example schematic structural diagram of a WSS. FIG. 1 is a schematic diagram for describing a cause for crosstalk, and does not show a complete structure of the WSS. In FIG. 1, light entering an input port undergoes a series of processing (which may include deflection processing, demultiplexing and multiplexing processing, and the like) in the black box, and then is incident on an LCoS panel. A corresponding pixel on the LCoS diffracts required +1-order diffractive light to a corresponding output port based on a corresponding configuration. However, in this case, light at another diffraction order may possibly enter another output port. After entering corresponding input ports, diffractive light such as 0-order, −1-order, and +2-order diffractive light may possibly cause crosstalk on an optical link subsequently. For example, in FIG. 1, when the +1-order diffractive light needs to be output from an output port 3, other diffraction orders may be possibly output from other ports as crosstalk light. In this case, intra-band crosstalk is caused. However, once entering the corresponding output ports, this part of signals are difficult to eliminate, so that system performance is affected.

SUMMARY

In view of this, embodiments of the present technology provide a wavelength selective switch, so as to effectively increase a quantity of output ports and improve performance of isolation.

According to a first aspect, an embodiment of the present technology provides a WSS, where the WSS includes an optical fiber array and a liquid crystal on silicon LCoS panel. The optical fiber array includes a plurality of ports. The plurality of ports include one input port and a plurality of output ports. The input port is configured to receive a light beam, where the light beam is diffracted to the output ports through the LCoS panel. All diffraction orders that are generated after the diffraction are on a straight line, and the plurality of output ports are configured to obtain an order with strongest energy in all the diffraction orders. The plurality of output ports are arranged into one layer or a plurality of layers. At least one layer of output ports in the one layer or the plurality of layers of output ports are arranged in the following manner centers of the plurality of output ports are distributed along a curve, a straight line connecting centers of two output ports on the curve does not pass through the input port, there is only one intersection point between the straight line that all the diffraction orders pass through and the curve, a diffraction order at the intersection point is the order with strongest energy in all the diffraction orders, and one output port is arranged at the intersection point.

With reference to an implementation of the first aspect, in a first possible implementation of the first aspect, the curve is a part of a circle, and the circle meets the following condition:

an equation of the circle in a two-dimensional rectangular coordinate system is $x^2+y^2=r^2$, where x and y represent coordinates of a point on the circle in the two-dimensional rectangular coordinate system, and r represent a constant; and the two-dimensional rectangular coordinate system is a rectangular coordinate system centered around the input port in a plane in which the output port is located.

With reference to the first aspect or the first possible implementation of the first aspect, in a second possible implementation of the first aspect, the curve is a part of an ellipse, and the ellipse meets the following condition:

an equation of the ellipse in a two-dimensional rectangular coordinate system is $$\frac{x^2}{a^2}+\frac{y^2}{b^2}=1,$$

where x and y represent coordinates of a point on the ellipse in the two-dimensional rectangular coordinate system, a and b represent constants, a is not equal to b and both a and b are greater than 0; and the two-dimensional rectangular coordinate system is a rectangular coordinate system centered around the input port in a plane in which the output port is located.

With reference to any one of the first aspect, or the first to second possible implementations of the first aspect, in a third possible implementation of the first aspect, to ensure that a straight line connecting centers of any two output ports on the curve does not pass through the input port, a space is reserved at an end of the curve. No output port is arranged in the space. In this way, a straight line passing through the input port has at most one intersection point with the curve.

With reference to any one of the first aspect, or the first to third possible implementations of the first aspect, in a fourth possible implementation of the first aspect, the output ports are arranged into the plurality of layers. In the plurality of layers of output ports, one layer of output ports intersect with the straight line that all the diffraction orders pass through. A diffraction order at an intersection point is the order with strongest energy in all the diffraction orders. Other single-layer output ports are arranged between adjacent diffraction orders in all the diffraction orders.

With reference to any one of the first aspect, or the first to fourth possible implementations of the first aspect, in a fifth possible implementation of the first aspect, the output ports are arranged into the plurality of layers. In the plurality of layers of output ports, arrangements of all layers of output ports are the same or different. That arrangements of all layers of output ports are the same includes the arrangements of all the layers of output ports are the same as an arrangement of other single-layer output ports, or that arrangements of all layers of output ports are different includes an arrangement of at least one of the plurality of layers of output ports is different from an arrangement of other single-layer output ports.

With reference to any one of the first aspect, or the first to fifth possible implementations of the first aspect, in a sixth possible implementation of the first aspect, each single-layer output port in the plurality of output ports does not intersect with other single-layer output ports.

With reference to any one of the first aspect, or the first to sixth possible implementations of the first aspect, in a seventh possible implementation of the first aspect, the WSS further includes a deflection processing component, a reflection component, a demultiplexing and multiplexing component, and a lens component, where the deflection processing component includes beam deformation and deflection conversion components, the lens component includes one lens or a combination of a plurality of lenses, and the demultiplexing and multiplexing component includes a grating.

With reference to any one of the first aspect, or the first to seventh possible implementations of the first aspect, in an eighth possible implementation of the first aspect, the WSS further includes a collimator array, where the collimator array is located behind the optical fiber array and is configured to collimate light that is incident from the input port, and light that passes through the collimator array enters the deflection processing component.

With reference to the first aspect, or the first to eighth possible implementations of the first aspect, in a ninth possible implementation of the first aspect, a randomly polarized light beam that is incident from the collimator array is converted into linearly polarized light through the deflection processing component, and then the linearly polarized light is incident on the grating after being expanded by the lens component. Light diffracted from the grating is incident to different regions on the LCoS panel through the lens component, and light reflection directions of different wavelengths can be separately controlled by controlling liquid crystal phases of the different regions on the LCoS panel. Light output from the LCoS panel is reflected by the reflection component, passes through the lens component, the grating, and the deflection processing component, and is input to an output port of the collimator array.

According to a second aspect, an embodiment of the present technology provides a WSS, where the WSS includes an optical fiber array and a liquid crystal on silicon LCoS panel, and the optical fiber array includes a plurality of ports. The plurality of ports include one input port and a plurality of output ports. The input port is configured to receive a light beam, where the light beam is diffracted to the output ports through the LCoS panel. All diffraction orders that are generated after the diffraction are on a straight line, and the plurality of output ports are configured to obtain an order with strongest energy in all the diffraction orders. The plurality of output ports are arranged into one layer or a plurality of layers. At least one layer of output ports in the one layer or the plurality of layers of output ports are arranged in the following manner:

centers of the plurality of output ports are distributed along a combination line, where the combination line includes a line segment, a straight line connecting centers of two output ports on the combination line does not pass through the input port, there is only one intersection point between the straight line that all the diffraction orders pass through and the combination line, a diffraction order at the intersection point is the order with strongest energy in all the diffraction orders, and one output port is arranged at the intersection point.

With reference to an implementation of the second aspect, in a first possible implementation of the second aspect, the combination line further includes a curve connected to the line segment.

With reference to the second aspect or the first possible implementation of the second aspect, in a second possible implementation of the second aspect, the curve is a part of a circle, and the circle meets the following condition:

an equation of the circle in a two-dimensional rectangular coordinate system is $x^2+y^2=r^2$, where x and y represent coordinates of a point on the circle in the two-dimensional rectangular coordinate system, and r represent a constant; and the two-dimensional rectangular coordinate system is a rectangular coordinate system centered around the input port in a plane in which the output port is located.

With reference to any one of the second aspect, or the first to second possible implementations of the second aspect, in a third possible implementation of the second aspect, the curve is a part of an ellipse, and the ellipse meets the following condition:

an equation of the ellipse in a two-dimensional rectangular coordinate system is $$\frac{x^2}{a^2}+\frac{y^2}{b^2}=1,$$

where x and y represent coordinates of a point on the ellipse in the two-dimensional rectangular coordinate system, a and b represent constants, a is not equal to b and both a and b are greater than 0; and the two-dimensional rectangular coordinate system is a rectangular coordinate system centered around the input port in a plane in which the output port is located.

With reference to any one of the second aspect, or the first to third possible implementations of the second aspect, in a fourth possible implementation of the second aspect, to ensure that a straight line connecting centers of any two output ports on the combination line does not pass through the input port, a space is reserved at an end of the combination line. No output port is arranged in the space. In this way, a straight line passing through the input port has at most one intersection point with the combination line.

With reference to any one of the second aspect, or the first to fourth possible implementations of the second aspect, in a fifth possible implementation of the second aspect, the output ports are arranged into the plurality of layers. In the plurality of layers of output ports, one layer of output ports intersect with the straight line that all the diffraction orders pass through. A diffraction order at an intersection point is the order with strongest energy in all the diffraction orders. Other single-layer output ports are arranged between adjacent diffraction orders in all the diffraction orders.

With reference to any one of the second aspect, or the first to fifth possible implementations of the second aspect, in a sixth possible implementation of the second aspect, the output ports are arranged into the plurality of layers. In the plurality of layers of output ports, arrangements of all layers of output ports are the same or different. That arrangements of all layers of output ports are the same includes the arrangements of all the layers of output ports are the same as an arrangement of other single-layer output ports, or that arrangements of all layers of output ports are different includes an arrangement of at least one of the plurality of layers of output ports is different from an arrangement of other single-layer output ports.

With reference to any one of the second aspect, or the first to sixth possible implementations of the second aspect, in a seventh possible implementation of the second aspect, each single-layer output port in the plurality of output ports does not intersect with other single-layer output ports.

With reference to any one of the second aspect, or the first to seventh possible implementations of the second aspect, in an eighth possible implementation of the second aspect, the WSS further includes a deflection processing component, a reflection component, a demultiplexing and multiplexing component, and a lens component, where the deflection processing component includes beam deformation and deflection conversion components, the lens component includes one lens or a combination of a plurality of lenses, and the demultiplexing and multiplexing component includes a grating.

With reference to any one of the second aspect, or the first to eighth possible implementations of the second aspect, in a ninth possible implementation of the second aspect, the WSS further includes a collimator array, where the collimator array is located behind the optical fiber array and is configured to collimate light that is incident from the input port, and light that passes through the collimator array enters the deflection processing component.

With reference to the second aspect, or the first to ninth possible implementations of the second aspect, in a tenth possible implementation of the second aspect, a randomly polarized light beam that is incident from the collimator array is converted into linearly polarized light through the deflection processing component, and then the linearly polarized light is incident on the grating after being expanded by the lens component. Light diffracted from the grating is incident to different regions on the LCoS panel through the lens component, and light reflection directions of different wavelengths can be separately controlled by controlling liquid crystal phases of the different regions on the LCoS panel. Light output from the LCoS panel is reflected by the reflection component, passes through the lens component, the grating, and the deflection processing component, and is input to an output port of the collimator array.

Embodiments of the present disclosure provide a WSS based on an LCoS optical switching engine. An output port arrangement solution of an optical fiber array of the WSS is as follows: centers of output ports are arranged along a curve or along a combination line that includes a line segment, and a straight line connecting centers of any two output ports on the curve or the combination line does not pass through an input port. A light beam received from an input port is diffracted to the output ports through an LCoS panel, and a straight line that all diffraction orders that are generated after the diffraction pass through intersects with the curve or the line segment, and there is only one intersection point. An output port at the intersection point may obtain an order with strongest energy. Other crosstalk orders cannot enter adjacent output ports. This effectively improves performance of isolation. In addition, the output ports are arranged along the curve or the combination line. This can effectively increase a quantity of arranged output ports. The WSS has a high practicability.

BRIEF DESCRIPTION OF DRAWINGS

To describe the technical solutions in the embodiments of the present disclosure or in the prior art more clearly, the following briefly describes the accompanying drawings for describing the background and the embodiments. The accompanying drawings in the following description show merely some embodiments of the present disclosure, and a person of ordinary skill in the art may still derive other accompanying drawings or embodiments according to these drawings or description without creative efforts, and the present disclosure aims to cover all these derived accompanying drawings or embodiments.

DESCRIPTION OF EMBODIMENTS

To make the objectives, technical solutions, and advantages of the present technology clearer and more comprehensible, the following further describes the present technology in detail with reference to the accompanying drawings and embodiments. It should be understood that the specific embodiments described herein are merely used to explain the present technology but are not intended to limit the present technology. The described embodiments are merely some but not all of the embodiments of the present technology. All other embodiments obtained by a person of ordinary skill in the art based on the embodiments of the present technology without creative efforts shall fall within the protection scope of the present technology.

The present technology provides an LCoS-based wavelength selective switch, so as to effectively suppress crosstalk diffractive light. It should be noted that, the "connection" in the embodiments of the present technology refers to a connection on an optical path. A person skilled in the art may understand that, specific optical components may not necessarily have an essential physical contact-type connection relationship, but spatial positions of these optical components and component features of these optical components enable these optical components to form a connection relationship on an optical path.

Figure 1:
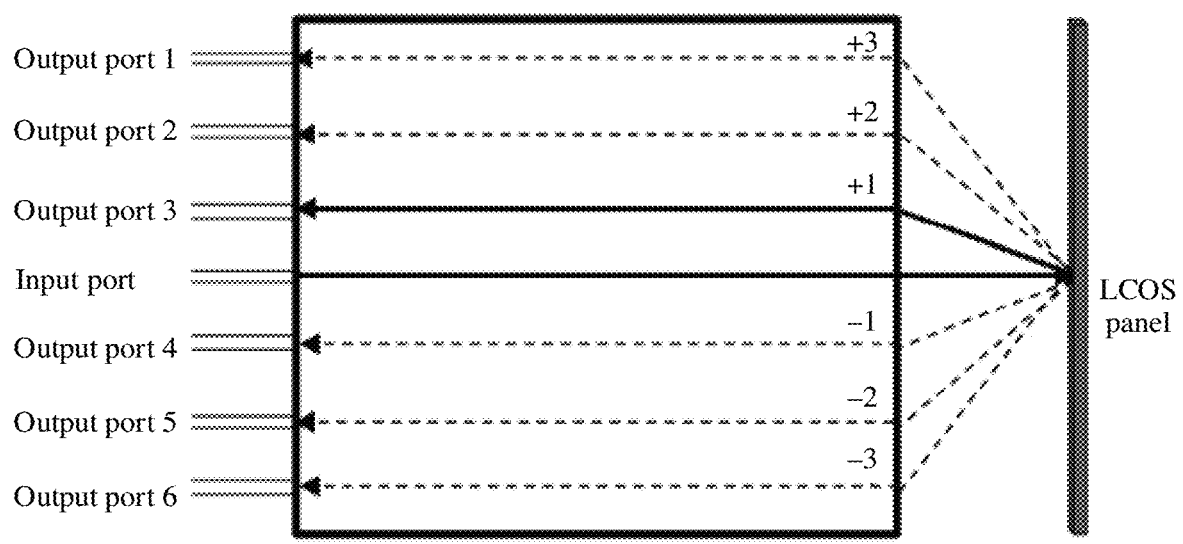
FIG. 1 is an example schematic principle diagram of generating crosstalk by a WSS in the related art.
Figure 2:
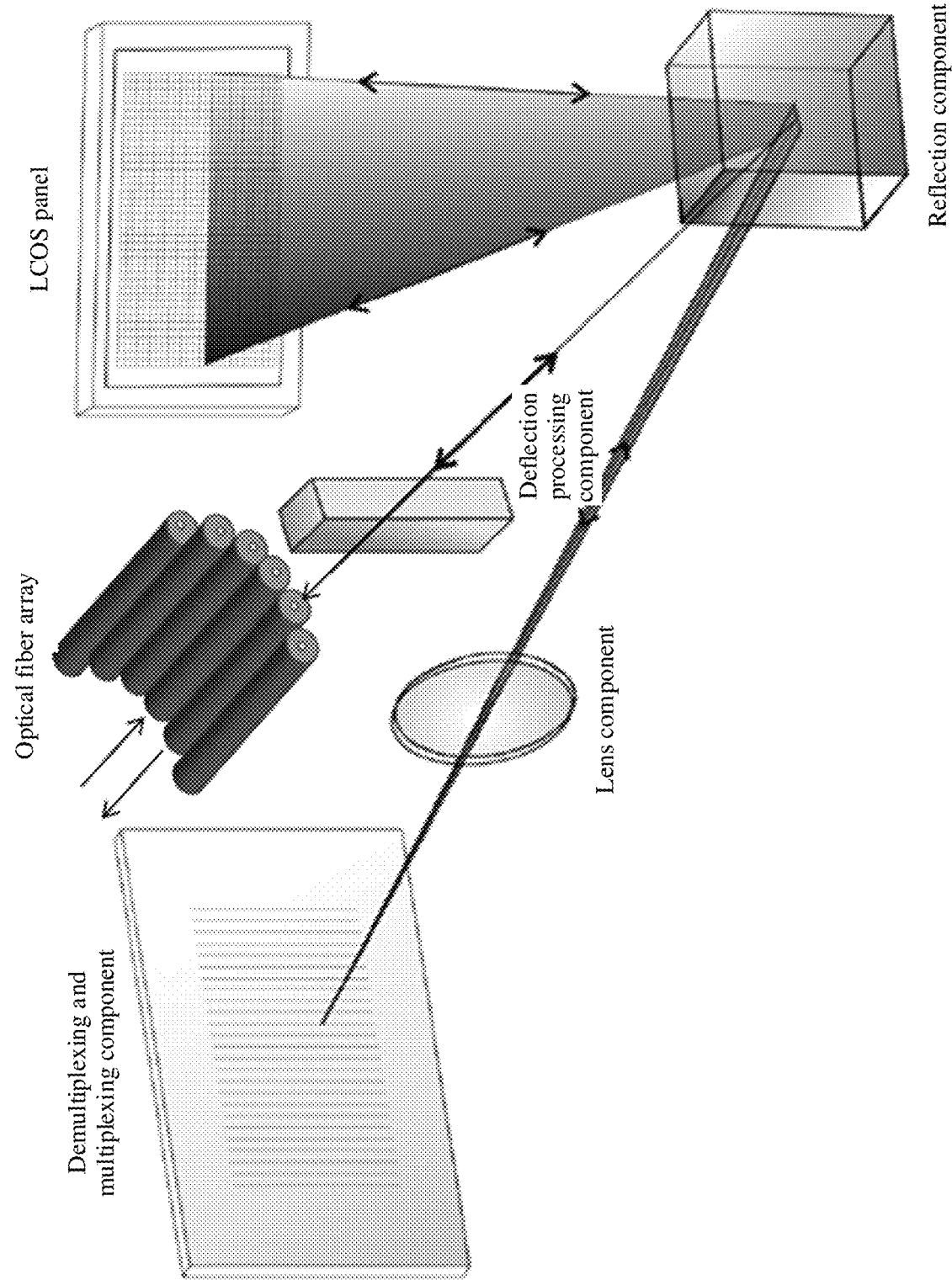
FIG. 2 is an example schematic structural diagram of a WSS according to an embodiment of the present technology.

As shown in FIG. 2, the LCoS-based WSS mainly includes an optical fiber array used for input and output, a deflection processing component used for deflection processing, a reflection component used for light reflection, a lens component used for light focusing, a demultiplexing and multiplexing component used for demultiplexing and multiplexing, and an LCOS panel used for optical path deflection and port switching.

Optionally, the WSS may further include a collimator array that is located behind the optical fiber array and that is configured to collimate light. Collimation is to convert divergent light into collimated light. Optionally, the deflection processing component may include beam deformation and polarization conversion components, so that a light spot forms a required shape and enters an optical path at a specific angle. Optionally, the lens component may be one lens or a combination of a plurality of lenses. A redirected optical path enables the optical path to meet a size limitation of an actual component. Optionally, the demultiplexing and multiplexing component may be a grating.

A randomly polarized light beam that is incident from the collimator array is converted into linearly polarized light through the polarization conversion component, and then the linearly polarized light is incident on a diffraction grating after being expanded by the lens component. After being diffracted, the linearly polarized light is incident to different regions on the LCoS panel through the lens component. Light reflection directions of different wavelengths can be separately controlled by controlling liquid crystal phases of the different regions on the LCoS panel. Reflected light passes through the lens component, the diffraction grating, and the deflection processing component, and is input to an output port of the collimator array. Liquid crystals in different regions on an LCoS chip can independently control an optical signal that is incident to the regions, and an LCoS-based WSS component can switch any input wavelength to any output port.

FIG. 2 is an example schematic diagram. In an example embodiment, light emitting from the lens component is parallel light instead of scattered light. FIG. 2 schematically shows a corresponding light ray for describing expansion of various wavelengths in a horizontal direction. The LCoS-based WSS is a mature technology. In this embodiment of the present technology, only a part such as an optical fiber array that changes in compared with an optical fiber array in a conventional WSS is described in detail. In addition, the embodiment of the present technology is also applicable to another LCoS-based WSS other than the LCoS-based WSS in FIG. 2. Only a corresponding output port arrangement needs to be correspondingly changed, and functions and position relationships of other components of the WSS may remain unchanged. In addition, an improved part of output ports in this embodiment of the present technology is also applicable to a future potential WSS of another structure.

The LCoS-based WSS may implement Flexgrid filtering for a spectrum signal. However, when the LCoS is used as an optical engine to load the grating, a plurality of diffraction orders are generated. A prime light intensity order is a +1 order. This order is output at a destination output port as emergent light. At the same time, light at other orders is output from other ports as crosstalk signals. This causes infra-band crosstalk between WSS ports. A value of the crosstalk is generally above −25 dB. However, a system generally has a crosstalk requirement of less than −30 dB or even lower for a single WSS. Therefore, for the LCoS-based WSS, a crosstalk suppression method needs to be found.

Figure 3A:
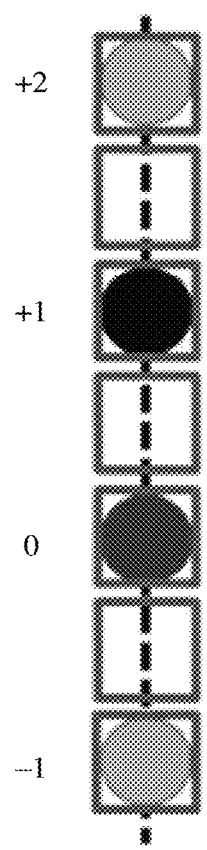
FIG. 3a is an example schematic diagram of a linear bilateral arrangement of output ports of an LCoS-based WSS optical fiber array in the related art.
Figure 3B:
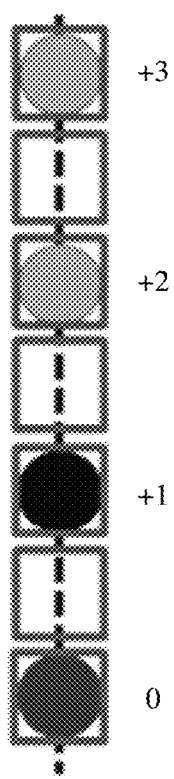
FIG. 3b is an example schematic diagram of a linear unilateral arrangement of output ports of an LCoS-based WSS optical fiber array in the related art.

FIG. 3a is an example schematic diagram of a linear bilateral arrangement of output ports of an LCoS-based WSS optical fiber array in the related art. FIG. 3b is an example schematic diagram of a linear unilateral arrangement of output ports of an LCoS-based WSS optical fiber array in the related art.

As shown in FIG. 3a and FIG. 3b, in a current design solution of the LCoS-based WSS, a method for maintaining relatively high isolation is to change the original linear bilateral arrangement of the output ports of the WSS optical fiber array shown in FIG. 3a to the linear unilateral arrangement shown in FIG. 3b. When a ladder-like discrete blazed grating is loaded on the LCoS, all diffraction orders of gratings are symmetric by using an input port (at a 0 order) as a center. A +1 order is a target order, at which there is a maximum energy distribution. Therefore, orders except the +1 order are all crosstalk orders. If the output ports are arranged in a linear bilateral manner, the 0 order is located in the middle of a current linear arrangement, and crosstalk orders exist on both sides of the 0 order. However, currently, in most LCoS-based WSS products in the industry, the output ports are arranged in a unilateral manner, and all the output ports are arranged on one side of the 0 order. All negative-order crosstalk light is avoided. In addition, to meet requirements of a communications system, a difference between powers of channels cannot be too large. The LCoS is required to flexibly control a power of each channel and control powers of 96 channels in an entire C band to be at a similar power level. In this case, energy that is attenuated may be transferred to a reverse side of the 0 order, namely, the side of a negative order. This reserves operation space for an LCoS control algorithm.

However, an insertion loss of the LCoS is positively correlated with a diffraction angle. To be specific, a larger diffraction angle indicates a larger insertion loss. Therefore, once an insertion loss baseline is determined, a range of diffraction angles that may be supported by the LCoS is also determined. For the linear bilateral arrangement and the linear unilateral arrangement of the output ports, in a case of a same insertion loss baseline, diffraction angles that may be supported by the LCoS are the same. In this case, within a limited range of diffraction angles, the foregoing linear unilateral arrangement of the output ports leads to a result that a quantity of the output ports is only half of a quantity of the output ports in the linear bilateral arrangement. In addition, in an actual WSS product, when deflection is performed for each output port at a diffraction angle, in most cases, a blazed grating with a fractional period is used. This causes sub-peak crosstalk distributed between main orders. The sub-peak crosstalk cannot be avoided through the linear unilateral arrangement of the output ports. Therefore, isolation of the output ports is still affected.

It is a technical difficulty in current development of the wavelength selective switch to achieve high isolation of the output ports while maintaining a large quantity of the output ports of the WSS. Currently, existing technical solutions are difficult to meet increasingly high requirements of crosstalk performance indicators in the future.

Figure 4:
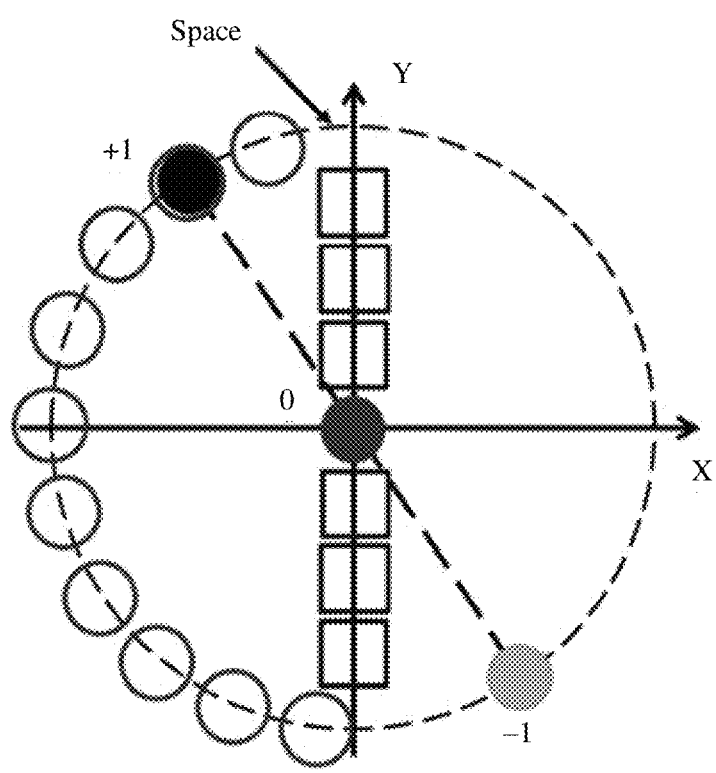
FIG. 4 is an example schematic diagram of comparison between an output port arrangement solution of an LCoS-based WSS optical fiber array in the present technology and an output port arrangement solution of an LCoS-based WSS optical fiber array in the related art according to a first embodiment of the present technology.

FIG. 4 is a schematic diagram of comparison between an output port arrangement solution of an LCoS-based WSS optical fiber array in the present technology and an output port arrangement solution of an LCoS-based WSS optical fiber array in the related art according to a first embodiment of the present technology. As shown in FIG. 4, an output port arrangement used in the related art is a linear distribution (where a port is represented by a block), and an input port (at a 0 order) is located in the center or at one end. A two-dimensional rectangular coordinate system centered around the input port (at the 0 order) is created. A light beam received by the input port is diffracted to output ports through an LCoS panel, and all diffraction orders generated after the diffraction are symmetric with respect to the input port and are on a straight line. Therefore, if the output ports are arranged in a linear distribution manner, no matter the output ports are arranged unilaterally or bilaterally, the straight line that all the diffraction orders pass through overlaps a straight line connecting centers of all the output ports. Consequently, crosstalk orders other than a +1 order is most likely to enter adjacent output ports. This results in poor performance of isolation.

According to a principle of a diffraction grating, a primary maximum of a 0 order of amplitude grating diffraction has no dispersion and cannot be used for a spectrum analysis. However, energy of the primary maximum of the 0 order of the amplitude grating diffraction accounts for a large part of total energy.

However, a high-order primary maximum used for the spectrum analysis includes too little energy (e.g., high-order diffraction efficiency is low). A blazed grating controls a shape of a groove to introduce an additional phase to transfer energy of the 0 order to other orders. The blazed grating only produces a maximum light intensity for a blazed wavelength at a same order. The LCoS has a two-dimensional deflection capability. To be specific, a tilted blazed grating needs to be loaded on the LCoS to deflect incident light to a direction other than directions of an x-axis and a y-axis in the two-dimensional coordinate system shown in FIG. 4. Any switching of an entire x-y two-dimensional coordinate plane may be achieved by using an angle at which the blazed grating is rotated. FIG. 4 shows an output port arrangement solution of an LCoS-based WSS optical fiber array (where a port is represented by a circle) according to the first embodiment of the present technology. Centers of output ports are arranged along an arc, where the arc is a curve. It should be particularly noted that, in an arc arrangement, a straight line connecting centers of any two output ports does not pass through an input port, and therefore, there is at most one intersection point between a straight line passing through the input port and the arc. The light beam received from the input port is diffracted to the output ports through the LCoS panel. All the diffraction orders are symmetric with respect to the input port and pass through the straight line (which is represented by a dashed line in FIG. 4). The straight line intersects with the arc, and there is only one intersection point. A diffraction order at the intersection point is a +1 order, namely, an order with strongest energy in all the diffraction orders. One output port is arranged at the intersection point to obtain the order with strongest energy. In this case, only a target order, namely, the +1 order, may enter the output ports, and all other crosstalk orders cannot enter adjacent output ports, so that extremely high isolation between the output ports can be achieved. In addition, when insertion loss baselines are the same and diffraction angles are the same, a larger quantity of output ports may be supported if the output ports are arranged along the arc.

Optionally, the arc is a part of a circle or an ellipse (FIG. 4 shows only a case in which the arc is a part of the circle). A two-dimensional rectangular coordinate system centered around the input port in a plane in which the output ports are located is created.

An equation of the circle in the two-dimensional rectangular coordinate system is $x^2+y^2=r^2$, where x and y represent coordinates of a point on the circle in the two-dimensional rectangular coordinate system, and r represent a constant.

An equation of the ellipse in the two-dimensional rectangular coordinate system is $$\frac{x^2}{a^2} + \frac{y^2}{b^2} = 1,$$

where x and y represent coordinates of a point on the ellipse in the two-dimensional rectangular coordinate system, a and b represent constants, a is not equal to b and both a and b are greater than 0.

Further, to ensure that the straight line connecting the centers of the any two output ports in the arc arrangement does not pass through the input port, a space is reserved at an end of the arc. No output port is arranged in the space. In this way, the straight line passing through the input port has at most one intersection point with the combination line.

Figure 5:
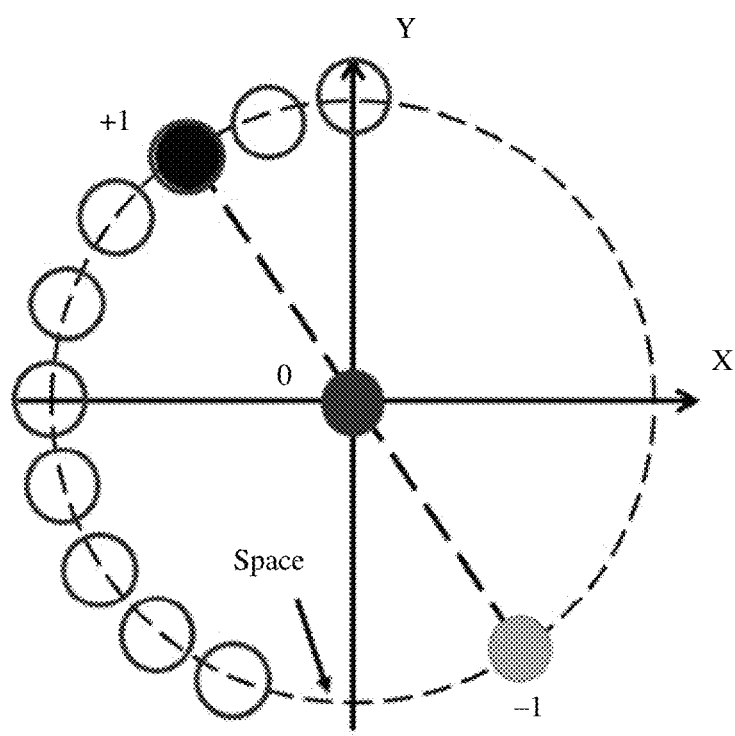
FIG. 5 is an example schematic diagram of an output port arrangement, along a curve, of an LCoS-based single-layer WSS optical fiber array according to a second embodiment of the present technology.

A second embodiment of the present technology provides a wavelength selective switch WSS. The WSS system shown in FIG. 2 is used as an example. FIG. 5 is a schematic diagram of an output port arrangement along a curve of an LCoS-based single-layer WSS optical fiber array according to the second embodiment of the present technology. Only one case is provided as an example. In principle, all curves that meet the following requirements are applicable.

The WSS provided in this embodiment includes an optical fiber array and a liquid crystal on silicon LCoS panel, and the optical fiber array includes a plurality of ports. The plurality of ports include one input port and a plurality of output ports. The input port is configured to receive a light beam, where the light beam is diffracted to the output ports through the LCoS panel. All diffraction orders that are generated after the diffraction are symmetric with respect to the input port and are on a straight line (which is represented by a dashed line in FIG. 5). The plurality of output ports are configured to obtain an order with strongest energy (namely a +1 order in FIG. 5) in all the diffraction orders. The plurality of output ports are arranged into one layer or a plurality of layers. At least one layer of output ports in the one layer or the plurality of layers of output ports are arranged in the following manner:

centers of the plurality of output ports are distributed along the curve, a straight line connecting centers of any two output ports on the curve does not pass through the input port, there is only one intersection point between the straight line that all the diffraction orders pass through and the curve, a diffraction order at the intersection point is the order with strongest energy in all the diffraction orders, and one output port is arranged at the intersection point.

In this case, all other crosstalk orders cannot enter adjacent output ports, so that extremely high isolation between the output ports can be achieved. In addition, when insertion loss baselines are the same and diffraction angles are the same, a larger quantity of the output ports may be supported if the output ports are arranged along the curve.

Further, to ensure that the straight line connecting the centers of the any two output ports on the curve does not pass through the input port, in FIG. 5, a space is reserved at an end of the curve. No output port is arranged in the space. In this way, a straight line passing through the input port has at most one intersection point with the curve.

Optionally, the curve includes an arc. For the arc, refer to the first embodiment.

Further, the WSS provided in this embodiment further includes a deflection processing component, a reflection component, a demultiplexing and multiplexing component, and a lens component. The deflection processing component includes beam deformation and deflection conversion components. The lens component includes one lens or a combination of a plurality of lenses, and the demultiplexing and multiplexing component includes a grating.

Optionally, the WSS provided in this embodiment further includes a collimator array. The collimator array is located behind the optical fiber array and is configured to collimate light that is incident from the input port. Light that passes through the collimator array enters the deflection processing component.

Optionally, a randomly polarized light beam that is incident from the collimator array is converted into linearly polarized light through the deflection processing component, and then the linearly polarized light is incident on the grating after being expanded by the lens component.

Optionally, light diffracted from the grating is incident to different regions on the LCoS panel through the lens component, and light reflection directions of different wavelengths are separately controlled by controlling liquid crystal phases of the different regions on the LCoS panel.

Optionally, light output from the LCoS panel is reflected by the reflection component, passes through the lens component, the grating, and the deflection processing component, and is input to an output port of the collimator array.

Figure 6:
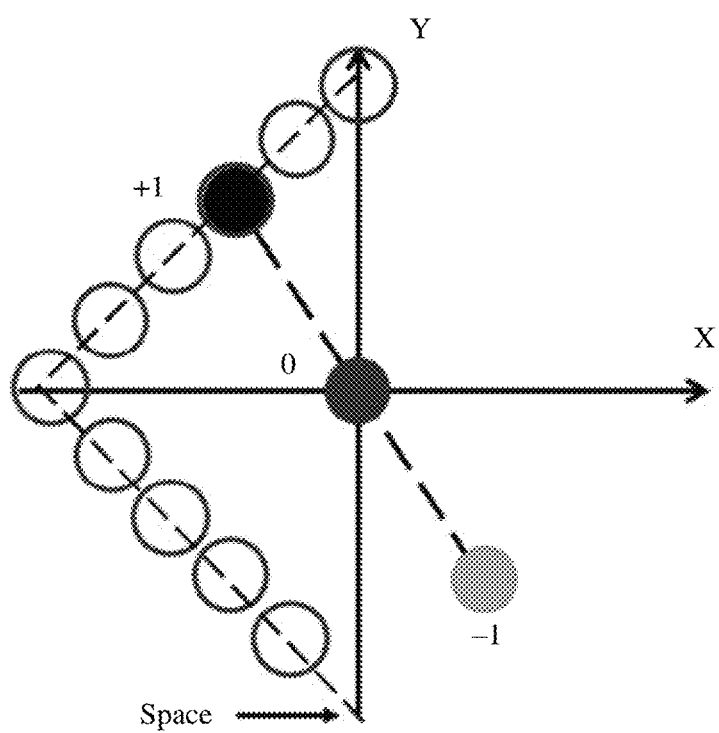
FIG. 6 is an example schematic diagram of an output port arrangement, along a combination line, of an LCoS-based single-layer WSS optical fiber array according to a third embodiment of the present technology.
Figure 7:
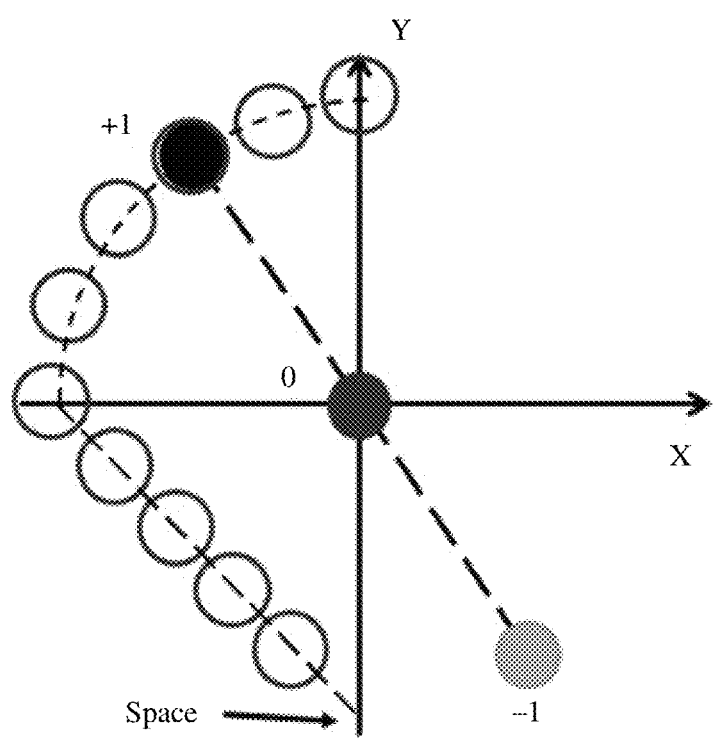
FIG. 7 is an example schematic diagram of an output port arrangement, along a combination line, of another LCoS-based single-layer WSS optical fiber array according to a third embodiment of the present technology.

A third embodiment of the present technology provides a WSS. The WSS system shown in FIG. 2 is used as an example. FIG. 6 and FIG. 7 only provide one case as an example. In principle, cases that meet the following requirements are applicable. The WSS includes an optical fiber array and a liquid crystal on silicon panel, and the optical fiber array includes a plurality of ports. The plurality of ports include one input port and a plurality of output ports. The input port is configured to receive a light beam, where the light beam is diffracted to the output ports through the LCoS panel. All diffraction orders that are generated after the diffraction are symmetric with respect to the input port and are on a straight line. The plurality of output ports are configured to obtain an order with strongest energy in all the diffraction orders. The plurality of output ports are arranged into one layer or a plurality of layers. At least one layer of output ports in the one layer or the plurality of layers of output ports are arranged in the following manner:

centers of the plurality of output ports are distributed along a combination line. FIG. 6 is a schematic diagram of an output port arrangement along a combination line of an LCoS-based single-layer WSS optical fiber array according to the third embodiment of the present technology. The combination line includes a line segment, a straight line connecting centers of any two output ports on the combination line does not pass through the input port, and there is only one intersection point between the straight line (which is represented by a dashed line in FIG. 6) that all the diffraction orders pass through and the combination line. A diffraction order at the intersection point is the order with strongest energy in all the diffraction orders, and one output port is arranged at the intersection point.

In this case, all other crosstalk orders cannot enter adjacent output ports, so that extremely high isolation between the output ports can be achieved. In addition, when insertion loss baselines are the same and deflection angles are the same, a larger quantity of the output ports may be supported if the output ports are arranged along the combination line.

Optionally, FIG. 7 is a schematic diagram of an output port arrangement along a combination line of another LCoS-based single-layer WSS optical fiber array according to the third embodiment of the present technology. The combination line may further include a curve connected to a line segment. The curve includes an arc. For the arc, refer to the first embodiment.

Further, to ensure that the straight line connecting the centers of the any two output ports on the combination line does not pass through the input port, in FIG. 6 and FIG. 7, a space is reserved at an end of the combination line. No output port is arranged in the space. In this way, a straight line passing through the input port has at most one intersection point with the combination line.

Further, the WSS provided in this embodiment further includes a deflection processing component, a reflection component, a demultiplexing and multiplexing component, and a lens component. The deflection processing component includes beam deformation and deflection conversion components. The lens component includes one lens or a combination of a plurality of lenses, and the demultiplexing and multiplexing component includes a grating.

Optionally, the WSS provided in this embodiment further includes a collimator array. The collimator array is located behind the optical fiber array and is configured to collimate light that is incident from the input port. Light that passes through the collimator array enters the deflection processing component.

Optionally, a randomly polarized light beam that is incident from the collimator array is converted into linearly polarized light through the deflection processing component, and then the linearly polarized light is incident on the grating after being expanded by the lens component.

Optionally, light diffracted from the grating is incident to different regions on the LCoS panel through the lens component, and light reflection directions of different wavelengths are separately controlled by controlling liquid crystal phases of the different regions on the LCoS panel.

Optionally, light output from the LCoS panel is reflected by the reflection component, passes through the lens component, the grating, and the deflection processing component, and is input to an output port of the collimator array.

Figure 8:
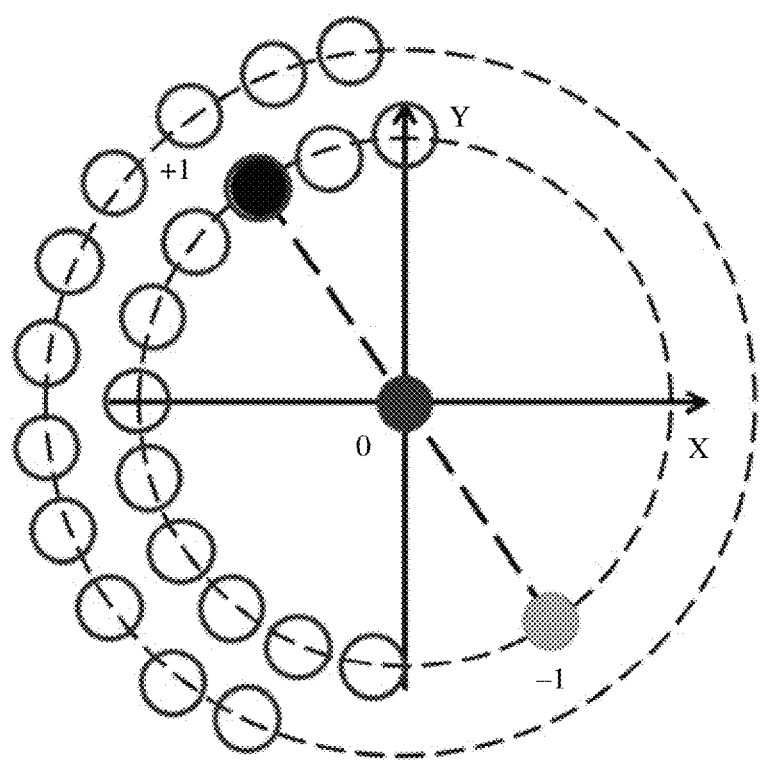
FIG. 8 is an example schematic diagram of a multi-layer arrangement of output ports based on an LCoS according to a fourth embodiment of the present technology.

FIG. 8 is a schematic diagram of a multi-layer output port arrangement of an LCoS-based WSS optical fiber array according to a fourth embodiment of the present technology. A light beam received from an input port is diffracted to output ports through an LCoS panel, and all diffraction orders that are generated after the diffraction are on a straight line. When the output ports of the WSS optical fiber array are arranged into a plurality of layers, arrangements of all layers of output ports are the same or different. That arrangements of all layers of output ports are the same includes the arrangements of all layers of output ports are the same as an arrangement of other single-layer output ports, or that arrangements of all layers of output ports are different includes an arrangement of at least one of the plurality of layers of output ports is different from an arrangement of other single-layer output ports. An arrangement of each of the plurality of layers of output ports may be any one of the output port arrangements provided in the first embodiment to the third embodiment of the present technology. Each single-layer output port does not intersect with other single-layer output ports. In the plurality of layers of output ports, one layer of output port intersects with the straight line that all diffraction orders pass through. A diffraction order at an intersection point is the order with strongest energy in all the diffraction orders, and other single-layer output ports are arranged between adjacent diffraction orders in all the diffraction orders.

The embodiments of the present technology provide a WSS based on an LCoS optical switching engine. An output port arrangement solution of an optical fiber array of the WSS is as follows: centers of output ports are arranged along a curve or along a combination line that includes a line segment, and a straight line connecting centers of any two output ports on the curve or the combination line does not pass through an input port. A light beam received from an input port is diffracted to the output ports through an LCoS panel, and a straight line that all diffraction orders that are generated after the diffraction pass through intersects with the curve or the line segment, and there is only one intersection point. An output port at the intersection point may obtain an order with strongest energy. Other crosstalk orders cannot enter adjacent output ports. This effectively improves performance of isolation. In addition, the output ports are arranged along the curve or the combination line. This can effectively increase a quantity of arranged output ports. The WSS has a high practicability.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application.

What is claimed is:

1. A wavelength selective switch (WSS), comprising:
   an optical fiber array; and
   a liquid crystal on silicon (LCoS) panel, wherein
      the optical fiber array comprises a plurality of ports,
      the plurality of ports comprise an input port and a plurality of output ports, the input port is configured to receive a light beam, the light beam is diffracted to the plurality of output ports through the LCoS panel, all diffraction orders that are generated after the diffraction are on a straight line, and the plurality of output ports are configured to obtain an order with strongest energy in all the diffraction orders, and
      the plurality of output ports are arranged into one layer or a plurality of layers, and at least one layer of output ports in the one layer or the plurality of layers of output ports are arranged in the following manner:
   centers of the plurality of output ports are distributed along a curve, a straight line connecting centers of any two output ports on the curve does not pass through the input port, only one intersection point exists between the straight line that all the diffraction orders pass through and the curve, a diffraction order at the intersection point is the order with strongest energy in all the diffraction orders, and one output port is arranged at the intersection point.

2. The WSS according to claim 1, wherein the curve is a part of a circle, and the circle meets the following conditions:
   an equation of the circle in a two-dimensional rectangular coordinate system is $x^2+y^2=r^2$, wherein x and y represent coordinates of a point on the circle in the two-dimensional rectangular coordinate system, and r represent a constant; and
   the two-dimensional rectangular coordinate system is a rectangular coordinate system centered around the input port in a plane in which the output port is located.

3. The WSS according to claim 1, wherein the curve is a part of an ellipse, and the ellipse meets the following conditions:
   an equation of the ellipse in a two-dimensional rectangular coordinate system is $$\frac{x^2}{a^2} + \frac{y^2}{b^2} = 1,$$

wherein x and y represent coordinates of a point on the ellipse in the two-dimensional rectangular coordinate system, a and b represent constants, a is not equal to b, and both a and b are greater than 0; and
   the two-dimensional rectangular coordinate system is a rectangular coordinate system centered around the input port in a plane in which the output port is located.

4. The WSS according to claim 1, wherein
   the output ports are arranged into the plurality of layers, and in the plurality of layers of output ports, one layer of output ports intersect with the straight line that all the diffraction orders pass through; and
   a diffraction order at an intersection point is the order with strongest energy in all the diffraction orders, and other single-layer output ports are arranged between adjacent diffraction orders in all the diffraction orders.

5. The WSS according to claim 1, wherein the output ports are arranged into the plurality of layers, and in the plurality of layers of output ports, arrangements of all layers of output ports are the same or different, wherein that arrangements of all layers of output ports are the same comprises the arrangements of all the layers of output ports are the same as an arrangement of other single-layer output ports, or that arrangements of all layers of output ports are different comprises an arrangement of at least one of the plurality of layers of output ports is different from an arrangement of other single-layer output ports.

6. The WSS according to claim 4, wherein each single-layer output port in the plurality of layers of output ports does not intersect with other single-layer output ports.

7. The WSS according to claim 5, wherein each single-layer output port in the plurality of layers of output ports does not intersect with other single-layer output ports.

8. The WSS according to claim 1, wherein
the WSS further comprises a deflection processing component, a reflection component, a demultiplexing and multiplexing component, and a lens component, wherein the deflection processing component comprises beam deformation and deflection conversion components, the lens component comprises one lens or a combination of a plurality of lenses, and the demultiplexing and multiplexing component comprises a grating.

9. The WSS according to claim 8, wherein
the WSS further comprises a collimator array, wherein the collimator array is located behind the optical fiber array and is configured to collimate light that is incident from the input port, and light that passes through the collimator array enters the deflection processing component.

10. The WSS according to claim 9, wherein
a randomly polarized light beam that is incident from the collimator array is converted into linearly polarized light through the deflection processing component, and then the linearly polarized light is incident on the grating after being expanded by the lens component;
light diffracted from the grating is incident to different regions on the LCoS panel through the lens component, and light reflection directions of different wavelengths are separately controlled by controlling liquid crystal phases of the different regions on the LCoS panel; and
light output from the LCoS panel is reflected by the reflection component, passes through the lens component, the grating, and the deflection processing component, and is input to an output port of the collimator array.

11. A wavelength selective switch (WSS), comprising:
an optical fiber array; and
a liquid crystal on silicon (LCoS) panel, wherein
the optical fiber array comprises a plurality of ports, the plurality of ports comprise one input port and a plurality of output ports, the input port is configured to receive a light beam, the light beam is diffracted to the output ports through the LCoS panel, all diffraction orders that are generated after the diffraction are on a straight line, and the plurality of output ports are configured to obtain an order with strongest energy in all the diffraction orders, and
the plurality of output ports are arranged into one layer or a plurality of layers, and at least one layer of output ports in the one layer or the plurality of layers of output ports are arranged in the following manner:
centers of the plurality of output ports are distributed along a combination line, wherein the combination line comprises a line segment, a straight line connecting centers of any two output ports on the combination line does not pass through the input port, only one intersection point exists between the straight line that all the diffraction orders pass through and the combination line, a diffraction order at the intersection point is the order with strongest energy in all the diffraction orders, and one output port is arranged at the intersection point.

12. The WSS according to claim 11, wherein the combination line further comprises a curve connected to the line segment.

13. The WSS according to claim 12, wherein the curve is a part of a circle, and the circle meets the following conditions:
an equation of the circle in a two-dimensional rectangular coordinate system is $x^2+y^2=r^2$, wherein x and y represent coordinates of a point on the circle in the two-dimensional rectangular coordinate system, and r represent a constant; and
the two-dimensional rectangular coordinate system is a rectangular coordinate system centered around the input port in a plane in which the output port is located.

14. The WSS according to claim 12, wherein the curve is a part of an ellipse, and the ellipse meets the following conditions:
an equation of the ellipse in a two-dimensional rectangular coordinate system is $$\frac{x^2}{a^2} + \frac{y^2}{b^2} = 1,$$

wherein x and y represent coordinates of a point on the ellipse in the two-dimensional rectangular coordinate system, a and b represent constants, a is not equal to b, and both a and b are greater than 0; and
the two-dimensional rectangular coordinate system is a rectangular coordinate system centered around the input port in a plane in which the output port is located.

15. The WSS according to claim 11, wherein
the output ports are arranged into the plurality of layers, and in the plurality of layers of output ports, one layer of output ports intersect with the straight line that all the diffraction orders pass through; and
a diffraction order at an intersection point is the order with strongest energy in all the diffraction orders, and other single-layer output ports are arranged between adjacent diffraction orders in all the diffraction orders.

16. The WSS according to claim 11, wherein the output ports are arranged into the plurality of layers, and in the plurality of layers of output ports, arrangements of all layers of output ports are the same or different, wherein that arrangements of all layers of output ports are the same comprises the arrangements of all the layers of output ports are the same as an arrangement of other single-layer output ports, or that arrangements of all layers of output ports are different comprises an arrangement of at least one of the plurality of layers of output ports is different from an arrangement of other single-layer output ports.

17. The WSS according to claim 14, wherein each single-layer output port in the plurality of layers of output ports does not intersect with other single-layer output ports.

18. The WSS according to claim 15, wherein each single-layer output port in the plurality of output ports does not intersect with other single-layer output ports.

* * * * *